F. L. MARTENETTE.
SPRING FOR VEHICLES.
APPLICATION FILED DEC. 16, 1912.
1,105,358.
Patented July 28, 1914.
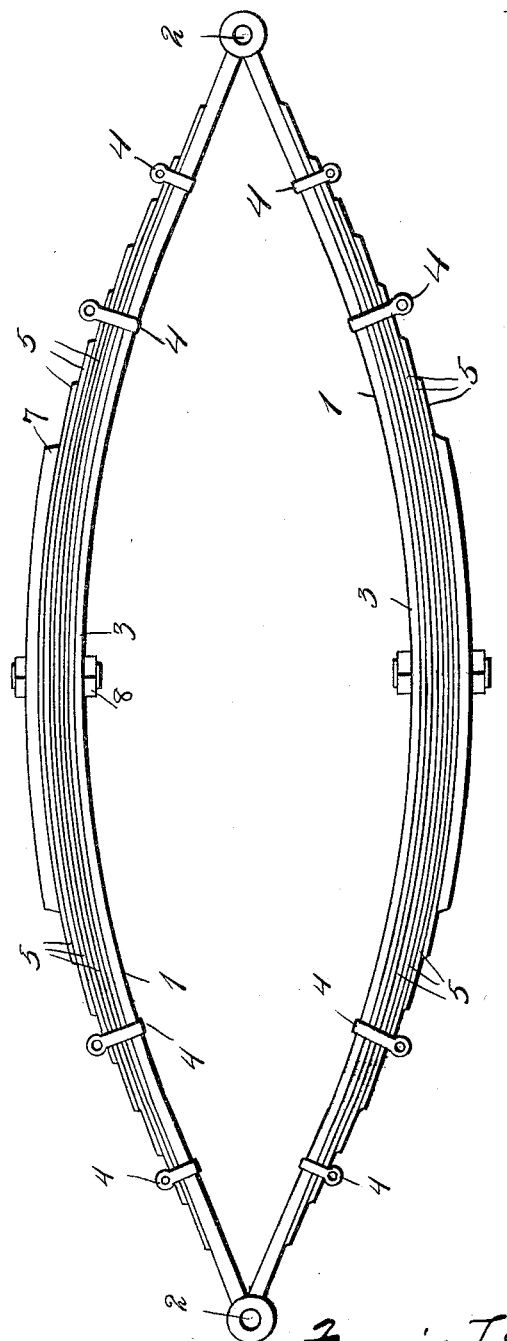
THE NORRIS PETERS CO., PHOTO-LITHO., WASHINGTON, D. C.

UNITED STATES PATENT OFFICE.

FRANCIS L. MARTENETTE, OF CHICO, CALIFORNIA.

SPRING FOR VEHICLES.

1,105,358.   Specification of Letters Patent.   Patented July 28, 1914.

Application filed December 16, 1912. Serial No. 737,068.

*To all whom it may concern:*

Be it known that I, FRANCIS L. MARTENETTE, a citizen of the United States, residing at Chico, in the county of Butte and State of California, have invented certain new and useful Improvements in Springs for Vehicles, of which the following is a specification.

My invention relates to springs and particularly to an elliptic spring to be used on vehicles.

The object of the invention is to provide a spring of a novel character, which will possess unusual quickness to recover from stress or shocks, great resiliency, and less liability of breaking.

Referring to the drawing forming a portion of this specification, the view illustrates a side elevation of my improved spring.

Referring more particularly to the drawing, the numeral 1 designates the main or master leaves of the spring, which converge and are connected at their ends in the usual manner, as at 2. The master leaves 1 are extremely thin in the center of the spring, as at 3, and increase in thickness as they approach the ends. Mounted upon the master leaves 1 and secured by the usual securing members 4, is a plurality of leaves 5 formed preferably from thin metal similar to that used for heavy clock springs and of uniform thickness throughout their lengths. Mounted on these thin leaves are exterior leaves 7 of greater thickness than the leaves 5 and secured to the other leaves by bolts 8. The spring may be secured in place upon the vehicle in any desired manner; not illustrated, as having no bearing on this invention.

Heretofore it has been the practice to form the master leaves of this class of springs either of uniform thickness throughout their lengths or still more frequently, quite thick in the center of the springs and becoming much smaller toward the ends. By the construction of this invention, it is obvious that a great degree of resiliency is obtained and that the spring is less liable to break as the strain is more evenly distributed throughout its length. Where the master leaves are thinnest, there is a larger number of the leaves 5 than near the ends where the master spring is the thickest, thus making the resiliency of the spring uniform.

Having thus described my invention what I claim is:

1. A spring for vehicles comprising a master leaf relatively thin at its center, a plurality of thin flat leaves mounted on said master leaf, and an exterior leaf of greater thickness mounted on said flat leaves.

2. A spring for vehicles comprising a master leaf relatively thin at its center, a plurality of thin flat leaves of graduated lengths mounted on said master leaf and an exterior leaf of greater thickness mounted on the shortest of said flat leaves.

3. In a spring for vehicles, a pair of leaves connected at their ends and spaced apart at their centers, said leaves being thinnest at their central portions and increasing in thickness toward their ends, and a plurality of auxiliary leaves secured upon and exteriorly of said first mentioned leaves, said auxiliary leaves being of extreme and uniform thinness and of graduated lengths, and relatively short leaves of greater thickness mounted on said auxiliary leaves.

4. A spring for vehicles comprising leaves connected at their ends and spaced apart at their central portions, said leaves being thickest at their point of connection with each other and decreasing in thickness toward their centers, a plurality of auxiliary leaves connected with said first named leaves, said auxiliary leaves decreasing in length to form a stepped formation upon the first named leaves and being of extreme and uniform thinness, and exterior leaves of greater thickness but less length than said auxiliary leaves.

In testimony whereof I hereto affix my signature in the presence of two witnesses.

FRANCIS L. MARTENETTE.

Witnesses:
ARA B. SALISBURY,
JAKE SILBERSTEIN.

Copies of this patent may be obtained for five cents each, by addressing the "Commissioner of Patents, Washington, D. C."